United States Patent
Lang et al.

(10) Patent No.: US 10,632,923 B2
(45) Date of Patent: Apr. 28, 2020

(54) BEARING ASSEMBLY, FASTENING DEVICE HEREWITH, AND MOUNTING PART FOR VEHICLES COMPRISING SAID FASTENING DEVICE

(71) Applicant: Mekra Lang GmbH & Co. KG, Ergersheim (DE)

(72) Inventors: Werner Lang, Ergersheim (DE); Elmar Finkenberger, Adelshofen (DE); Bastian Renk, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 15/843,393

(22) Filed: Dec. 15, 2017

(65) Prior Publication Data

US 2018/0170262 A1 Jun. 21, 2018

(30) Foreign Application Priority Data

Dec. 21, 2016 (DE) .......................... 10 2016 225 763

(51) Int. Cl.
*B60R 1/076* (2006.01)
*B60R 1/062* (2006.01)
(Continued)

(52) U.S. Cl.
CPC ............ *B60R 1/076* (2013.01); *B60R 1/0617* (2013.01); *B60R 1/0625* (2013.01); *F16C 11/04* (2013.01);
(Continued)

(58) Field of Classification Search
CPC ..... B60R 1/076; B60R 1/0617; B60R 1/0625; B60Q 1/2665; E05D 11/1085
See application file for complete search history.

(56) References Cited

U.S. PATENT DOCUMENTS 6,390,630 B1 * 5/2002 Ochs ....................... B60R 1/074
248/478
8,209,816 B2 * 7/2012 Heger ...................... B60R 1/06
16/330
(Continued)

FOREIGN PATENT DOCUMENTS

DE 102008046794 A1 3/2010
DE 102010055529 A1 6/2012
(Continued)

OTHER PUBLICATIONS

German Office Action with English translation issued in corresponding German Application No. 10 2016 225 763.3 dated Nov. 24, 2017.
(Continued)

*Primary Examiner* — Kimberly T Wood
(74) *Attorney, Agent, or Firm* — Dority & Manning, P.A.

(57) ABSTRACT

The description relates to a bearing assembly for rotatably or pivotally connecting a first (4) and a second (6) component to each other, wherein the two components (4, 6) are connected by a connecting element (8) disposed to be coaxial to a rotary or pivot axis (A); each of the two components (4, 6) comprises at least one first contact zone (10.4, 10.6), the contact zones (10.4, 10.6) having first abutment faces (12.4, 12.6) which are complementary with respect to each other; the respective first abutment faces (12.4, 12.6) being urged towards each other with an elastic preload force by a biasing part; and a latching geometry acting as a first latching means (14) being arranged between the first abutment faces (12.4, 12.6). Each of the two components (4, 6) has at least one second contact zone (18.4, 18.6).

20 Claims, 4 Drawing Sheets

(51) Int. Cl.
   *B60R 1/06* (2006.01)
   *F16C 11/04* (2006.01)
   *F16C 11/10* (2006.01)
   *F16M 11/10* (2006.01)
   *E05D 11/10* (2006.01)
   *B60Q 1/26* (2006.01)

(52) U.S. Cl.
   CPC ............ *F16C 11/10* (2013.01); *F16M 11/10* (2013.01); *B60Q 1/2665* (2013.01); *E05D 11/1085* (2013.01); *F16M 2200/024* (2013.01)

(56) References Cited

U.S. PATENT DOCUMENTS

| | | | | |
|---|---|---|---|---|
| 8,544,151 | B2* | 10/2013 | Courbon | E05D 11/1078 16/334 |
| 9,291,248 | B2* | 3/2016 | Mittermair | F16H 55/06 |
| 9,395,032 | B2* | 7/2016 | Kotula | B25J 15/0061 |
| 2003/0218812 | A1 | 11/2003 | Foote et al. | |
| 2007/0035862 | A1* | 2/2007 | Brouwer | B60R 1/074 359/841 |

FOREIGN PATENT DOCUMENTS

| | | |
|---|---|---|
| RU | 2568512 C2 | 11/2015 |
| RU | 2603691 C2 | 11/2016 |
| WO | WO03011642 A1 | 2/2003 |

OTHER PUBLICATIONS

European Patent Office Search Report with English translation issued in corresponsing German Application No. 10 2016 225 763.3 dated Apr. 5, 2018.

Search Report from Office Action issued by the Russian Patent Office for corresponding Russian Application No. 2017144801 dated Jul. 12, 2018.

* cited by examiner

BEARING ASSEMBLY, FASTENING DEVICE HEREWITH, AND MOUNTING PART FOR VEHICLES COMPRISING SAID FASTENING DEVICE

FOREIGN PRIORITY STATEMENT

The present application claims priority under 35 U.S.C. § 119 to German Patent Application No. 10 2016 225 763.3, filed on Dec. 21, 2016, and which is incorporated by reference in its entirety herein.

FIELD OF THE INVENTION

The invention relates to a bearing assembly for rotatably or pivotally connecting a first and second component to each other, in particular, but not exclusively in a fastening device for attaching a mounting part to a vehicle. The present invention further relates to a fastening device comprising such bearing assembly, and to a mounting part using such fastening device.

BACKGROUND OF THE INVENTION

In the context of the present invention, the terms "mounting part" and "mounting parts" are to be understood as fitting or accessory parts which are affixed to vehicles by series production or after sales. Examples include inter alia indirect vision systems, mirror replacement systems, mirrors or mirror assemblies, cameras, illumination components or signalers. In the following description, the indirect vision system is picked out from these exemplary possibilities, but the description is not limited thereto.

Indirect vision systems for vehicles are supported with a known construction and way of mounting on a body part of a vehicle via a fastening device. The fastening device may be implemented in the nature of a support arm which has one of its ends fixed on the side of the vehicle body and carries the indirect vision system with its other free end.

Both for adjusting purposes and for the purpose of providing protection against collisions and accidents, such support arms are designed to be pivotable or rotatable with respect to the vehicle body. To this end, a bearing assembly is used which guides the support arm or cantilever arm in a rotatable or pivotable manner. For ensuring defined operational positions or locations, such bearing assemblies frequently include a latching geometry which acts as a latching means and is under spring tension. In operation, said latching means has to be able to take up the regular forces acting on it in order to hold the indirect vision system in its operating position. The term "regularly acting forces" is to be understood here in particular as wind-induced forces and vibrations or the like which occur during the driving operation.

Upon exceeding a limit value of the force which acts on the bearing device, the spring-induced latching effect of the bearing assembly is canceled, so that for instance in the event of a collision with an obstacle, a heavy impact or shock or the like, the support arm and hence the indirect vision system may perform a corresponding evasive movement. Large-size indirect vision systems, for instance large-area mirror systems may exert comparably high forces, i.e. torques on the bearing assembly in operation in particular due to their air resistance but also due to their own weight, acting both in the sense of an unlatching process of the latching device or latching geometry there and subjecting the bearing assembly itself with bending torques. In order to ensure that the operating position of the support or cantilever arm is safely maintained and/or the bearing assembly is capable of taking up the torque load, the respective active surfaces in the latching geometry and/or the support faces in the bearing assembly have to be designed in a correspondingly large size. This has the direct consequence that the active surfaces are subjected to a correspondingly high wear in the case of frequent use of the rotary bearing. Further, large active surfaces require correspondingly large dimensions of the bearing, which is undesirable in many cases because of design reasons.

It is thus the object of the present invention to design a bearing assembly in question in such a manner that it can withstand high loads in the operating position with a small installation space and has a high resistance to wear.

BRIEF DESCRIPTION OF THE INVENTION

According to the invention, for achieving this object a bearing assembly for rotatably or pivotally connecting a first and a second component to each other is provided, wherein the two components are connected by a connecting element disposed to be coaxial to a rotary or pivot axis; each of the two components comprises at least one first contact zone, the contact zones having first abutment faces which are complementary with respect to each other; the respective first abutment faces being urged towards each other with an elastic preload force by a biasing part (e.g., biasing part 17—FIG. 9); and a latching geometry acting as a first latching means being arranged between the first abutment faces. According to the invention, each of the two components has at least one second contact zone, the second contact zones comprising second abutment faces which can be made to interact with each other. Each of the second contact zones is arranged so as to be radially further outside with respect to the rotary or pivot axis than the first contact zones, and the second abutment faces of the second contact zones abut each other and hence interact with each other only in at least one defined relative position of the two components.

The mutual interaction of the second abutment faces is to be understood in the context of the present invention as an interaction of these abutment faces, providing an impeding, braking, latching or supporting effect or acting as a combination of said effects in the area of the rotary or pivot axis. Related effects between the first abutment faces and/or in the area of the rotary or pivot axis are thus supplemented and/or supported.

In other words, the second contact zones whose second abutment faces are in mutual abutment only in at least one defined relative position of the two components relative to each other, with said second contact zones being situated radially further outside with respect to the rotary or pivot axis than the first contact zones, the latching effect is supported for instance in the area of a first latching means formed by the first abutment faces, wherein said latching support is effective only in at least one defined relative position of the two components relative to each other. This defined relative position of the two components relative to each other preferably is that relative position which corresponds to at least one operating position of the two components relative to each other. Due to the fact that the second contact zones are radially further outside with respect to the rotary or pivot axis than the first contact zones, the second abutment faces or second latching means defined or formed by them are able in the latching case to apply a comparably high impeding or locking torque. This means that the operating position of the two components relative to each other is maintained steady. Due to the fact that the second contact zones are radially further outside with respect to the rotary or pivot axis than the first contact zones, the mounting in the area of the rotary or pivot axis will also be effectively supported and relieved with respect to wind- or weight-induced loads, especially bending moments, with said support and relieve advantageously corresponding in particular to the operating position of the two components relative to each other.

The terms "latching" and "support" are cited here merely as examples for achievable interactions between the second abutment faces.

The second abutment faces, when in mutual abutment in the at least one defined relative position of the two components relative to each other, interact with each other in such a way that they lock said relative position (in defined manner), which may represent a preferred design of the interaction.

Said way of locking the at least one relative position may include—as already explained by way of example—a cancelable positional fixing of the two components relative to each other and/or an additional support, in particular a torque support of the rotatable or pivotable connection the two components in the area of the rotary or pivot axis.

The cancelable positional fixing of the two components may be established preferably by a latching geometry between the second abutment faces which acts as a second latching means.

It is preferred that the first contact zones together with the first abutment faces provided therein each have the shape of a ring which is concentric to the rotary or pivot axis and the second contact zones together with the second abutment faces provided therein are radially spaced from the outer circumference of the ring. This allows a space-saving construction, and the annular shape of the first contact zones facilitates a latching effect or latching zone which may extend if applicable over full 360 degrees.

In case the second contact zones together with the abutment faces provided therein surround the first contact zones (likewise) in annular fashion, in particular in the shape of a ring segment, wherein in the event of a ring-segment like design of the second contact zones the ring segments formed thereby may be situated to be symmetric with respect to the rotary or pivot axis, defined relative positions of the first and second components relative to each other can be selected, which are additionally secured e.g. in terms of their latched condition by the second contact zones or the second abutment faces provided therein.

At least one of the first contact zones together with the first abutment face provided therein may be situated radially within a surrounding sealing with respect to the rotary or pivot axis. This means that at least the first contact zone is protected against detrimental environmental influences and hence against increased wear. The space delimited by the surrounding sealing may preferably contain a lubricant, which may help to further reduce wear.

The latching geometry between the two first abutment faces may be formed by a first latching toothing and the latching geometry between the two second abutment faces may be formed by a second latching toothing. Such latching toothings are unproblematic in terms of manufacturing technology, they can be designed with precision and have high reliability.

If the flank pitches of the teeth differ from each other in the first and second latching toothing, wherein it is particularly preferred that the flank pitch of the first latching toothing is larger than that of the second latching toothing, there will be the advantage that upon actuating the bearing assembly, i.e. in case of a relative swivel movement of the two components relative to each other, the active surfaces of the second latching toothing are not in contact with each other. This avoids unnecessary wear of the active surfaces. What is more, said active surfaces do not require any sealing towards outside and/or any additional lubrication, thus reducing the effort of assembly and maintenance of the bearing assembly.

The first and second contact zone may be formed in one piece on the first and second component, respectively. This represents a preferred embodiment in particular as seen from the viewpoint of manufacturing technology.

As an alternative to this, the first and second contact zone each may be an element which is separate from the first and second component, respectively, and non-rotatably connected to the first and second component, respectively. This allows—irrespective of the material from which the respective first and/or second component is made—to use materials and material combinations for the first and second contact zone which are best adapted to the respective demands.

A further subject-matter of the present invention is a fastening device for attaching a mounting part to a vehicle, comprising at least one component on the vehicle side and at least one component on the side of the mounting part, wherein these two components are connected to each other by at least one bearing assembly according to the present invention.

Further, a mounting part for vehicles, in particular commercial vehicles, is provided which comprises a fastening device according to the present invention.

BRIEF DESCRIPTION OF THE DRAWINGS

Further details, aspects and advantages of the present invention will be apparent more clearly from the following description on the basis of the drawings in which.

In the individual Figures of the drawing, which throughout are neither true to scale nor identical in size, the same reference symbols refer to identical or corresponding elements, components or portions.

DETAILED DESCRIPTION OF THE INVENTION

A bearing assembly as a whole designated with 2 in the drawing serves for rotatably or pivotally connecting two components to each other, namely a first component 4 and a second component 6. The rotary or pivot movement of the two components 4 and 6 relative to each other takes place here around an axis A.

Figure 1:
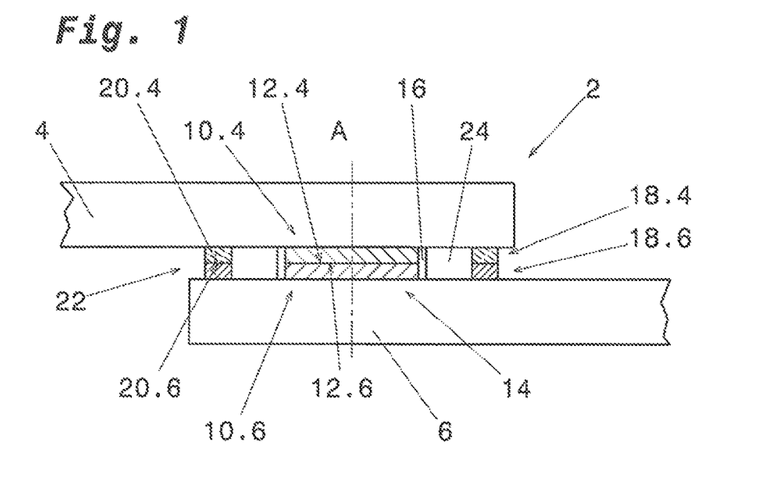
FIG. 1 shows in a partial schematic sectional view the construction and arrangement of a bearing assembly according to the invention.

In the illustrated application example and for the purpose of the following description, which however is not to be understood as being limited thereto, the two components 4 and 6 are parts of a support arm or cantilever arm of an indirect vision system for vehicles. In this context, the component 6 may be a component arranged on the side of a vehicle and having its (not shown) end on the right in FIG. 1 secured to a body part of the vehicle. The component 4 is a component on the side of the vision system and carries an indirect vision system on its (not shown) end on the left in FIG. 1, for instance an external mirror, a rear view camera or the like.

Figure 9:
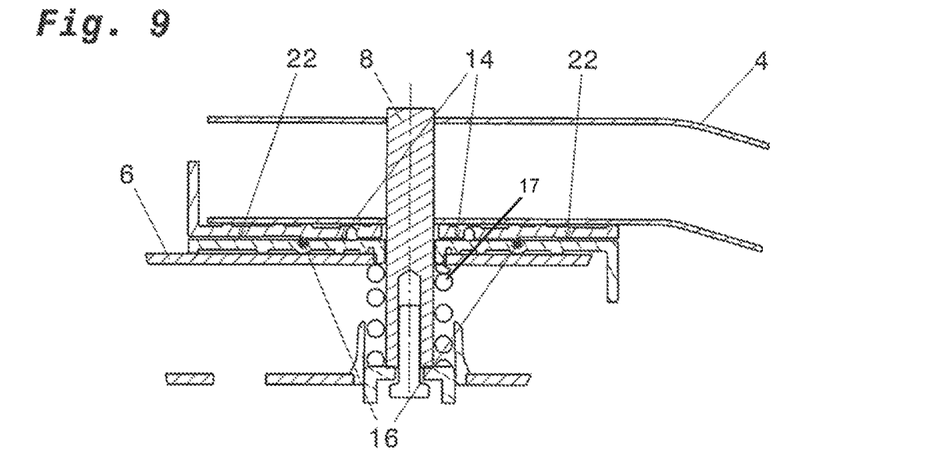
FIG. 9 is a sectional view through the bearing assembly of FIG. 7.

The connection between the two components 4 and 6 is made via a connecting element 8 (FIG. 9) in the form of a bolt, a screw or the like which is coaxial to axis A. This connection is spring-loaded in known manner in the axial direction of the connecting element 8. The spring loading is achieved for instance by a helical compression spring, as is illustrated in the Figure, or by Belleville springs or any other energy storing elements. The construction and functioning of such spring-loaded connections are generally known, so that they are not discussed in further detail here.

The connecting element 8 penetrates a first contact zone 10.4 on the part of the first component 4 and a first contact zone 10.6 on the part of the second component 6. The two contact zones 10.4 and 10.6 each have complementary first abutment faces 12.4 on the part of the first component 4 and 12.6 on the part of the second component 6. In the illustrated exemplary embodiment, a latching geometry serving as a first latching means 14 works between the abutment faces 12.4 and 12.6. As can be best seen in FIG. 8, the first latching means 14 (here on the part of the second component 6) is formed by a number of latching protrusions or latching teeth, which are circumferentially formed in annular fashion to be coaxial to axis A. Arranged on the outer circumference of the first latching means 14 is an annularly surrounding sealing 16 which seals off the interior of the first latching means 14 towards outside. Thus, the interior space of the first latching means 14 encapsulated by the sealing 16 may be filled with a suitable lubricant.

The sealing 16 may be implemented as a separate sealing element, for example in the form of an O-ring which is seated in a corresponding sealing groove. Just as well, the sealing may be formed by intermeshing surrounding profiles on the part of the contact zones 10.4 and 10.6 which in cooperation form a labyrinth seal. This allows to do without a separate sealing element, reducing the expenditure for assembly and maintenance and increasing the service life.

It is to be noted that the illustrated and described latching geometry of the first latching means 14 is to be understood only as an exemplary embodiment. In general, any type of functioning and/or supporting mechanism may be formed between the abutment faces 12.4 and 12.6, including impeding faces, frictional faces and support faces or the like.

In addition to the first contact zones 10.4 and 10.6, second contact zones 18.4 and 18.6 are provided which comprise second abutment faces 20.4 and 20.6 which like the first abutment faces 12.4 and 12.6 are complementary to each other and define a second latching means 22 in the illustrated exemplary embodiment.

It is also to be noted here that the illustrated and described latching geometry of the second latching means 22 is to be understood only as an exemplary embodiment. In analogy to the first abutment faces 12.4 and 12.6, any kind of functioning and/or supporting mechanism may be basically defined between the abutment faces 20.4 and 20.6, including impeding faces, frictional faces and support faces or the like.

The second abutment faces 20.4 and 20.6 which in the exemplary embodiment form or define the second latching means 22 between them are—in analogy to the first latching means 14—formed by a toothed profile in the respective abutment faces 20.4 and 20.6.

Figure 2:
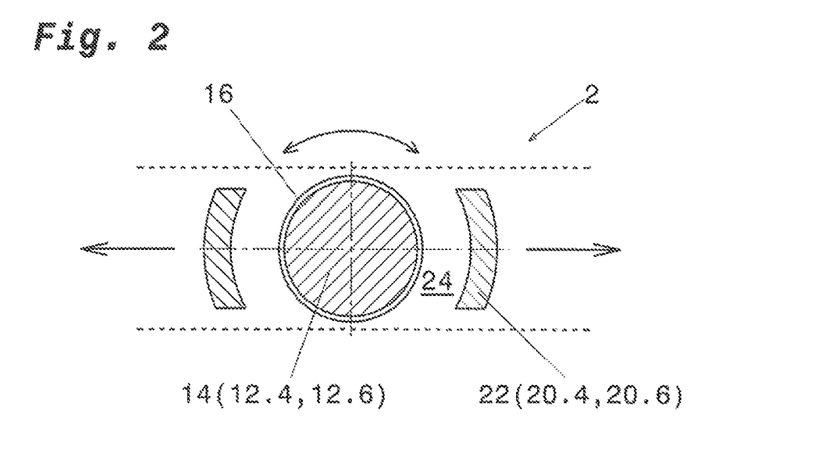
FIG. 2 schematically shows in simplified form a top view of a bearing assembly of the invention according to an embodiment.
Figure 3:
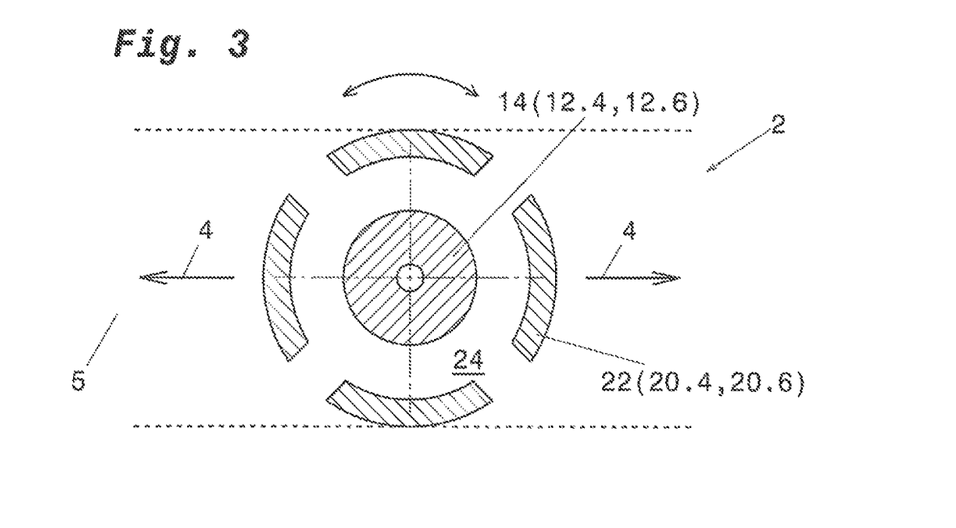
FIG. 3 shows a view of a further embodiment corresponding to FIG. 2.
Figure 8:
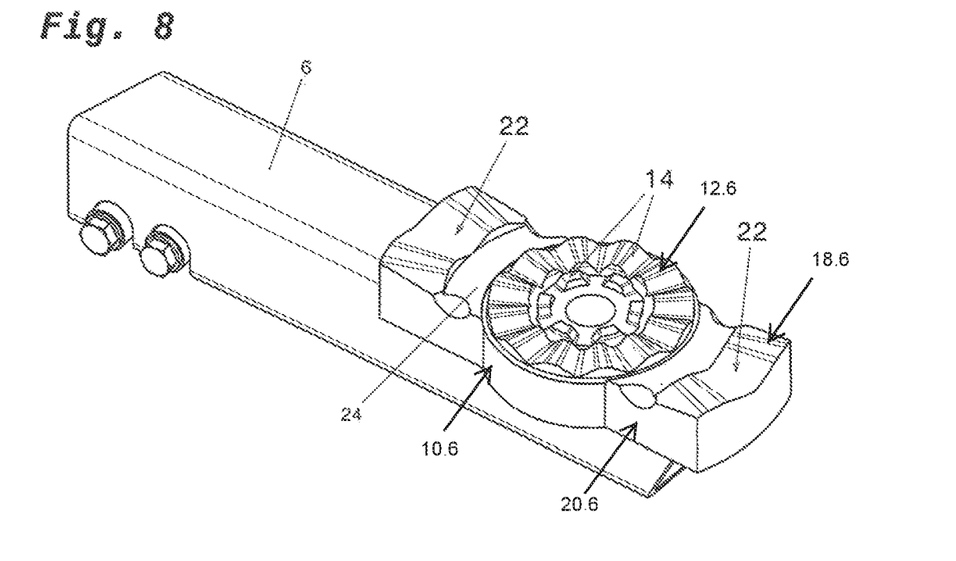
FIG. 8 is a perspective view as seen from obliquely above to the component (on the side of the vehicle) which is at the left in FIG. 7 together with a view of the bearing assembly there.

The toothed profile of the second latching means 22 is situated on a circle which is concentric to the toothed profile in the first latching means 14 or to axis A and is radially spaced from the outer circumference of the first latching means 14, as can be best seen in FIGS. 2, 3 and 8.

Accordingly, an open space or transition zone 24 is defined between the latching means 14 and 22.

The spacings of the respective toothings in the latching means 14 and 22 may be identical. They may also be different, wherein according to FIG. 8 the spacing of the toothing in the second latching means 22 is larger than that in the first latching means 14.

According to a particularly preferred embodiment of the present invention, the pitch of the active surfaces in the toothing of the first latching means 14 is larger than in the second latching means 22. If the pitch of the active surfaces in the first latching means is designated with S14 and the pitch of the active surfaces in the second latching means 22 is designated with S22, S14>S22 applies. Here, the "pitch" of the active surfaces in the latching means is the theoretical spiral path which would be covered by the latching face or active face (which corresponds to a helical surface) in one revolution around axis A.

Figure 4:
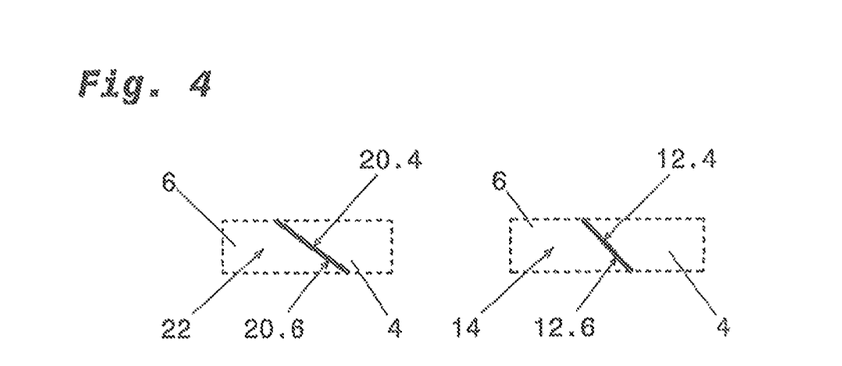
FIG. 4 and FIG. 5 schematically show in greatly simplified fashion the relative positions of the active surfaces in the respective latching geometries in the operating position and the rotary position, respectively.
Figure 5:
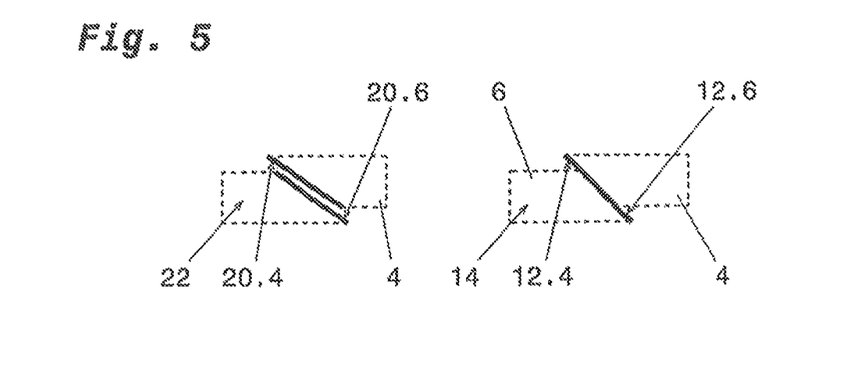
Figure 6:
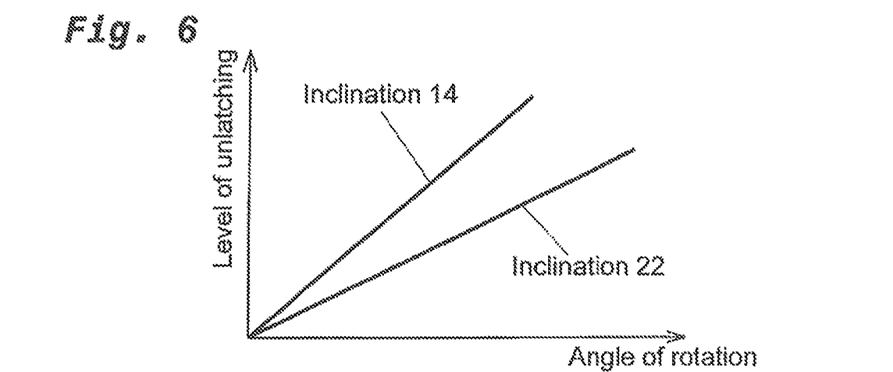
FIG. 6 is a graphic representation for illustrating the respective pitches in the two latching geometries.

FIGS. 4 to 6 illustrate the advantage resulting from these differing pitches. FIG. 4 shows the operating position of the two components 4 and 6 relative to each other, i.e. that position which corresponds to the normal operating state of the bearing assembly 2 in which the two components 4 and 6 extend for instance in elongated/co-linear manner or at a defined angle relative to each other, with the component 4 carrying the indirect vision system or a comparable accessory part at its free end. The two latching means 14 and 22 are in mutual abutment with their respective active surfaces, so that both latching means 14 and 22 are in operative engagement and provide a reliable rotary locking of the bearing assembly 2 in the operating position. Further, a torque support is also realized on the two components 4 and 6, if necessary.

In the course of a forced rotation, for instance of the first component 4 relative to the second component 6 around the axis A, the active surfaces in the first latching means 14 slide on each other. Due to the larger pitch of the active surfaces of the first latching means 14, the active surfaces of the second latching means 22 are disengaged from each other according to FIG. 5, i.e. the second abutment faces 20.4 and 20.6 separate from each other, so that any latching effect of the second latching means 22 is eliminated.

This results in the advantage that the active surfaces in the second latching means 22 are not subjected to any wear and tear even with frequent actuation of the bearing assembly 2, so that the second latching means 22 can achieve a very long service life and in designing the bearing assembly 2 it is not necessary to pay special attention to a high abrasion resistance of the materials used there. Furthermore, any sealing and lubricating measures in the area of the second latching means 22 are dispensable.

The respective second abutment faces 20.4 and 20.6 in the second latching means 2 are not required to be continuously formed in annular fashion around the first latching means 14, but may be formed according to FIGS. 2 and 8 in the form of two ring segment portions. FIG. 3 shows the possibility of arranging in total four ring segment portions of the second abutment faces 20.n around the first inner latching means 14.

In FIGS. 2 and 3, the arrangement of the ring segment portions of the second abutment faces 20.n is symmetric with respect to axis A. In case of the design of FIG. 2, the position of the two ring segment portions may also be offset relative to each other by 90 degrees or in any other angle. Furthermore, the design of FIG. 2 may also be realized such that one of the two ring segments is omitted.

Figure 7:
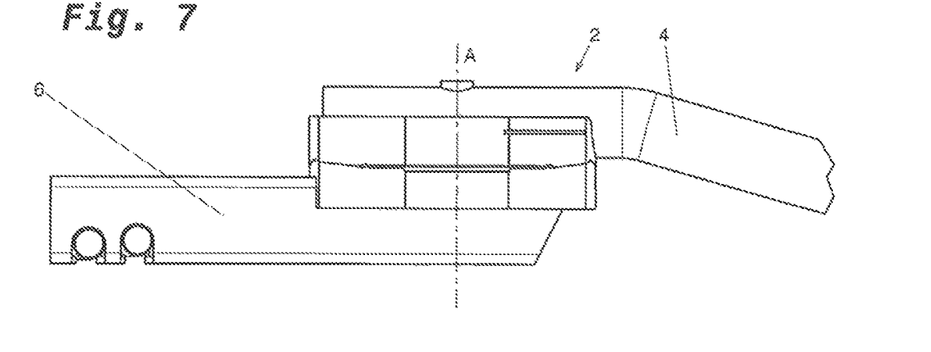
FIG. 7 is a side view of a bearing assembly according to the invention and a fastening device.

The position of the ring segments of the second abutment faces 20.n or 20.4 and 20.6 defines the reliably secured operating position of the first component 4 relative to the second component 6. In the embodiment of FIG. 2, said secured operating position would be an elongated/co-linear arrangement of the first component 4 relative to the second component 6, as is shown for instance in FIG. 7. Having the design of FIG. 3, both the mentioned elongated/co-linear arrangement and a position rotated to either side by 90 degrees relative thereto would be a reliably secured one. In all intermediate positions, the bearing assembly 2 is of comparably smooth-running nature, as the mechanism of the differing pitches explained on the basis of FIGS. 4 and 5 neutralizes the function of the second latching means 22 in the intermediate positions.

Figure 10:
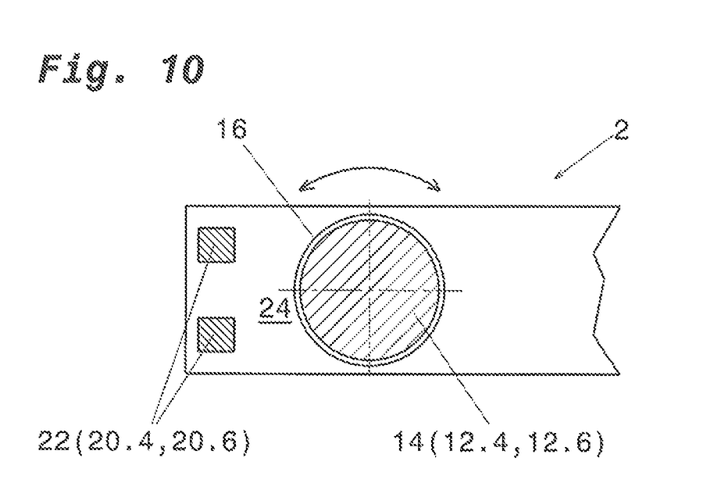
FIG. 10 is a view of a further embodiment corresponding to FIG. 2 or 3.

FIG. 10 shows the possibility of a non-symmetric arrangement of the second latching means 22 and the second abutment faces 20.4 and 20.6 relative to axis A. The second abutment faces 20.4 and 20.6 are disposed here for instance as a pair on one side of the axis A or the first latching means A.

It is also conceivable to combine the embodiments of FIGS. 2 or 3 and 10 with each other.

A transition zone not shown in further detail in the drawing may be provided in the free space or transition zone 24, and such transition zone may be designed for forming a transition between the profile of the active surfaces in the first latching means 14 and that of the second latching means 22.

It is to be highlighted again that the possibility of a latching between the two components 4 and 6 is to be understood merely as an exemplary embodiment. The respective abutment faces 12.4 and 12.6 or 20.4 and 20.6 may also have other functions and may serve for instance as frictional faces or inhibiting faces and/or as pure support faces. Depending on the latter, the design and/or configuration and/or arrangement and/or the material and the material combination of the abutment faces 12.4 and 12.6 and 20.4 and 20.6 can be designed or selected.

Furthermore, it goes without saying that the design of the first latching means 14 and second latching means 22 is not necessarily limited to the toothing illustrated in the exemplary embodiment. Other latching geometries in the form of defined faces are conceivable as well. Moreover, ball-type latching means or similar latching elements may be used, too. Such other embodiments may replace the illustrated toothing completely or in part and/or be used in combination therewith.

The first contact zones 10.4 and 10.6 and the second contact zones 18.4 and 18.6 may be formed in one piece with the material of the respective first and second components 4 and 6. Just as well, these contact zones may also be formed as separate elements which are manufactured from the same material or also a material other than that used for the components 4 and 6 and connected to the respective components 4 and 6 in a non-rotatable manner. This allows to select corresponding material combinations in the area of the abutment faces or latching means, which are optimized for the respective intended use.

Due to the fact that the second latching means 22 in the form of the two abutment faces 20.4 and 20.6 has a comparably large distance to the axis A, said second latching means is able to take up or absorb high torques, or exert a high holding torque against any turning movement in the bearing assembly 2. Nevertheless, the entire bearing assembly 2 is space-saving and compact in particular in the design of FIGS. 2, 7, 8 and 10.

LIST OF REFERENCE NUMERALS

A axis
2 bearing assembly
4 first component
6 second component
8 connecting element
10.4, 10.6 first contact zone
12.4, 12.6 first abutment face
14 first latching means
16 sealing
18.4, 18.6 second contact zone
20.4, 20.6 second abutment face
22 second latching means
24 transition zone

What is claimed is:
1. A bearing assembly comprising:
a first component comprising a first contact zone and a second contact zone, the first contact zone of the first component having a first abutment face, the second contact zone of the first component having a second abutment face;
a second component comprising a first contact zone and a second contact zone, the first contact zone of the second component having a first abutment face complementary to the first abutment face of the first component, the second contact zone of the second component having a second abutment face to selectively interact with the second abutment face of the first component;
a connecting element connecting the first component and the second component, the connecting element being disposed coaxial to a pivot axis;
a latching geometry acting as a first latch arranged between the first abutment face of the first component and the first abutment face of the second component at the first contact zones of the first and second components; and
a latching geometry acting as a second latch arranged between the second abutment face of the first component and the second abutment face of the second component at the second contact zones of the first and second components, wherein the second contact zone of the first component is arranged radially outward from the first contact zone of the first component with respect to the pivot axis, wherein the second contact zone of the second component is arranged radially outward from the first contact zone of the second component with respect to the pivot axis, wherein the second abutment face of the first component abuts the second abutment face of the second component, thereby interacting in at least one defined relative position of the first component and the second component, wherein, in the at least one defined relative position, the first abutment face of the first component abuts the first abutment face of the second component while the second abutment face of the first component simultaneously abuts the second abutment face of the second component, wherein the latching geometry acting as the first latch comprises a first latching toothing, and wherein the latching geometry acting as the second latch comprises a second latching toothing, the second latching toothing being different from the first latching toothing to selectively separate in at least one movement position wherein the first latching toothing is in contact.

2. The bearing assembly according to claim 1, wherein the first contact zone of the first component has as a first ring shape concentric to the pivot axis, wherein the second contact zone of the first component is radially spaced from an outer circumference of the first ring shape, wherein the first contact zone of the second component has as a second ring shape concentric to the pivot axis, and wherein the second contact zone of the second component is radially spaced from an outer circumference of the second ring shape.

3. The bearing assembly according to claim 1, wherein the first contact zone of the first component is a unitary integral piece with the second contact zone of the first component, and wherein the first contact zone of the second component is a unitary integral piece with the second contact zone of the second component.

4. The bearing assembly according to claim 1, wherein the first contact zone of the first component is a discrete piece, non-rotatably connected with the second contact zone of the first component, and wherein the first contact zone of the second component is a discrete piece, non-rotatably connected with the second contact zone of the second component.

5. The bearing assembly according to claim 4, wherein the first contact zone of the first component comprises a different material than the second contact zone of the first component, and wherein the first contact zone of the second component comprises a different material than the second contact zone of the second component.

6. The bearing assembly according to claim 1, wherein the second contact zone of the first component annularly surrounds the first contact zone of the first component, and wherein the second contact zone of the second component annularly surrounds the first contact zone of the second component.

7. The bearing assembly according to claim 6, wherein the second contact zone of the first component is symmetric to the second contact zone of the second component relative to the pivot axis.

8. The bearing assembly according to claim 7, wherein a position of the second contact zone of the first component relative to the second contact zone of the second component defines an operating position of the first component and the second component.

9. The bearing assembly according to claim 8, wherein the first abutment face of the first component or the first abutment face of the second component is situated radially within a surrounding sealing with respect to the pivot axis.

10. The bearing assembly according to claim 9, wherein a lubricant is provided in a space defined in part by the surrounding sealing.

11. The bearing assembly according to claim 1, wherein, in the at least one defined relative position, the second abutment face of the first component complements the second abutment face of the second component such that the second abutment face of the first component locks with the second abutment face of the second component.

12. The bearing assembly according to claim 11, wherein the at least one defined relative position is a selectively secured operating position such that the first component is non-permanently fixed relative to the second component.

13. The bearing assembly according to claim 12, wherein the selectively secured operating position is established by the latching geometry acting as the second latch arranged between the second abutment face of the first component and the second abutment face of the second component.

14. The bearing assembly according to claim 13, wherein a tooth spacing in the first latching toothing differs from a tooth spacing in the second latching toothing.

15. The bearing assembly according to claim 13, wherein a flank pitch of the first latching toothing differs from a flank pitch of the second latching toothing.

16. The bearing assembly according to claim 15, wherein the flank pitch of the first latching toothing is larger than the flank pitch of the second latching toothing.

17. A fastening device for attaching at least one mounting part to a vehicle, the fastening device comprising:
    a vehicle-side component fixed to the vehicle;
    a mounting-part-side component fixed to the mounting part; and
    a bearing assembly comprising
        a first component fixed to the vehicle-side component, the first component comprising a first contact zone and a second contact zone, the first contact zone of the first component having a first abutment face, the second contact zone of the first component having a second abutment face;
        a second component fixed to the mounting-part-side component, the second component comprising a first contact zone and a second contact zone, the first contact zone of the second component having a first abutment face complementary to the first abutment face of the first component, the second contact zone of the second component having a second abutment face to selectively interact with the second abutment face of the first component;
        a connecting element connecting the first component and the second component, the connecting element being disposed coaxial to a pivot axis;
        a latching geometry acting as a first latch arranged between the first abutment face of the first component and the first abutment face of the second component at the first contact zones of the first and second components; and
        a latching geometry acting as a second latch arranged between the second abutment face of the first component and the second abutment face of the second component at the second contact zones of the first and second components, wherein the second contact zone of the first component is arranged radially outward from the first contact zone of the first component with respect to the pivot axis, wherein the second contact zone of the second component is arranged radially outward from the first contact zone of the second component with respect to the pivot axis, wherein the second abutment face of the first component abuts the second abutment face of the first component, thereby interacting in at least one defined relative position of the first component and the second component, wherein, in the at least one defined relative position, the first abutment face of the first component abuts the first abutment face of the second component while the second abutment face of the first component simultaneously abuts the second abutment face of the second component, wherein the latching geometry acting as the first latch comprises a first latching toothing, and wherein the latching geometry acting as the second latch comprises a second latching toothing, the second latching toothing being different from the first latching toothing to selectively separate in at least one movement position wherein the first latching toothing is in contact.

18. A mounting part for vehicles, the mounting part comprising:
   a vehicle-side component;
   a mounting-part-side component attached to the vehicle-side component; and
   a bearing assembly comprising
      a first component fixed to the vehicle-side component, the first component comprising a first contact zone and a second contact zone, the first contact zone of the first component having a first abutment face, the second contact zone of the first component having a second abutment face;
      a second component fixed to the mounting-part-side component, the second component comprising a first contact zone and a second contact zone, the first contact zone of the second component having a first abutment face complementary to the first abutment face of the first component, the second contact zone of the second component having a second abutment face to selectively interact with the second abutment face of the first component;
      a connecting element connecting the first component and the second component, the connecting element being disposed coaxial to a pivot axis; and
      a latching geometry acting as a first latch arranged between the first abutment face of the first component and the first abutment face of the second component at the first contact zones of the first and second components; and
      a latching geometry acting as a second latch arranged between the second abutment face of the first component and the second abutment face of the second component at the second contact zones of the first and second components,
   wherein the second contact zone of the first component is arranged radially outward from the first contact zone of the first component with respect to the pivot axis,
   wherein the second contact zone of the second component is arranged radially outward from the first contact zone of the second component with respect to the pivot axis,
   wherein the second abutment face of the first component abuts the second abutment face of the first component, thereby interacting in at least one defined relative position of the first component and the second component,
   wherein, in the at least one defined relative position, the first abutment face of the first component abuts the first abutment face of the second component while the second abutment face of the first component simultaneously abuts the second abutment face of the second component,
   wherein the latching geometry acting as the first latch comprises a first latching toothing, and
   wherein the latching geometry acting as the second latch comprises a second latching toothing, the second latching toothing being different from the first latching toothing to selectively separate in at least one movement position wherein the first latching toothing is in contact.

19. A bearing assembly comprising:
   a first component comprising a first abutment face and a second abutment face arranged radially outward from the first abutment face of the first component with respect to a pivot axis;
   a second component comprising a first abutment face to selectively abut the first abutment face of the first component, the second component further comprising a second abutment face radially outward from the first abutment face of the second component to selectively abut the second abutment face of the first component; and
   a connecting element connecting the first component and the second component, the connecting element being disposed coaxial to the pivot axis;
   wherein the first abutment face of the first component and the first abutment face of the second component together define a complementary first toothing with a first latching geometry,
   wherein the second abutment face of the first component and the second abutment face of the second component together define a complementary second toothing with a second latching geometry, the second latching geometry being different from the first latching geometry,
   wherein the first component is pivotable about the pivot axis relative to the second component between a defined relative position and a movement position,
   wherein, in the defined relative position,
      the second abutment face of the first component abuts the second abutment face of the second component to interlock the second toothing according to the second latching geometry and
      the first abutment face of the first component abuts the first abutment face of the second component to interlock the first toothing according to the first latching geometry, and
   wherein, in the movement position,
      the second abutment face of the first component is spaced apart from the second abutment face of the second component and
      the first abutment face of the first component contacts the first abutment face of the second component to hold the second toothing apart and reduce friction for rotation of the first component about the pivot axis.

20. The bearing assembly according to claim 19, wherein a flank pitch of the first toothing differs from a flank pitch of the second toothing, or wherein a tooth spacing in the first toothing differs from a tooth spacing in the second toothing.

\* \* \* \* \*